United States Patent
Mehrotra

(10) Patent No.: US 12,360,822 B2
(45) Date of Patent: Jul. 15, 2025

(54) TECHNIQUES FOR DEPLOYING WORKLOADS IN A CLOUD-COMPUTING ENVIRONMENT

(71) Applicant: Microsoft Technology Licensing, LLC, Redmond, WA (US)

(72) Inventor: Sanjeev Mehrotra, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 657 days.

(21) Appl. No.: 17/826,915

(22) Filed: May 27, 2022

(65) Prior Publication Data

US 2023/0385122 A1    Nov. 30, 2023

(51) Int. Cl.
  *G06F 9/50* (2006.01)
  *G06F 9/455* (2018.01)
  *G06F 9/48* (2006.01)

(52) U.S. Cl.
  CPC ........ *G06F 9/5077* (2013.01); *G06F 9/45558* (2013.01); *G06F 9/4856* (2013.01); *G06F 2009/45562* (2013.01); *G06F 2209/508* (2013.01); *G06F 2209/509* (2013.01)

(58) Field of Classification Search
  CPC ........ G06F 9/50; G06F 9/5005; G06F 9/5011; G06F 9/5016; G06F 9/5022; G06F 9/5061
  See application file for complete search history.

(56) References Cited

U.S. PATENT DOCUMENTS

| | | | |
|---|---|---|---|
| 11,343,328 B2* | 5/2022 | Devireddy | H04L 43/10 |
| 12,001,870 B2* | 6/2024 | Junior | G06F 9/5077 |
| 2021/0133000 A1 | 5/2021 | Okman | |
| 2021/0357238 A1 | 11/2021 | Kirmse et al. | |
| 2022/0019452 A1 | 1/2022 | Levin et al. | |

OTHER PUBLICATIONS

"International Search Report and Written Opinion Issued in PCT Application No. PCT/US23/018235", Mailed Date: Jul. 14, 2023, 11 Pages.
Sayfan, Gigi, "Mastering Kubernetes", In book of Packt Publishing Ltd, May 2017, 400 Pages.

* cited by examiner

*Primary Examiner* — Andy Ho
(74) *Attorney, Agent, or Firm* — ArentFox Schiff LLP

(57) ABSTRACT

Described are examples for providing a standby workload to replace an active workload, including initializing a container for the standby workload that includes an entry point that points to a binary to be executed by the container, modifying the entry point of the container to execute a script that monitors a communication channel for an instruction for executing the standby workload, and instructing the standby workload to execute at least one of the binary or a different binary to replace the active workload.

20 Claims, 6 Drawing Sheets

TECHNIQUES FOR DEPLOYING WORKLOADS IN A CLOUD-COMPUTING ENVIRONMENT

BACKGROUND

Cloud-computing environments are provided for distributed storage and access of software (e.g., services or other applications), files, data, etc. across multiple devices connected via a network, such as the Internet. Using distributed nodes to store data and/or allow execution of the software can improve reliability of the software and data through redundancy, improved on-demand access of the software and data from various other nodes in the network, more efficient execution of software or retrieval of data by using certain nodes or services in the network, and/or the like. A cloud-computing environment can include one or more compute clusters that provide one or more functions. The compute clusters can include a workload that executes on one or more nodes to provide redundant functionality, and a load balancer or router that can balance requests across workloads or route requests based on a characteristic (e.g., an identifier in the request that is associated with one of the workloads). In one specific example, cloud-computing environments can be used to provide mobile edge computing (MEC) where certain functions of a mobile network can be provided as workloads on nodes in the cloud-computing environment.

In MEC, a centralized unit (CU) can be implemented in a back-end node, one or more distributed units (DUs) can be implemented in intermediate nodes, and various remote units (RU), which can provide at least physical (PHY) and/or media access control (MAC) layers of a base station or other radio access network (RAN) node of the mobile network, can be deployed at edge serves. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc. In addition, the CU, DUs, RUs, or portions thereof, may each execute as a workload on nodes of the cloud-computing environment and/or in a given compute cluster thereof.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method for providing a standby workload to replace an active workload is provided. The method includes initializing a container for the standby workload that includes an entry point that points to a binary to be executed by the container, modifying the entry point of the container to execute a script that monitors a communication channel for an instruction for executing the standby workload, and instructing the standby workload to execute at least one of the binary or a different binary to replace the active workload.

In another example, a device for providing a standby workload to replace an active workload is provided that includes a memory storing one or more parameters or instructions for deploying workloads in the cloud-computing environment, and at least one processor coupled to the memory. The at least one processor is configured to initialize a container for the standby workload that includes an entry point that points to a binary to be executed by the container, modify the entry point of the container to execute a script that monitors a communication channel for an instruction for executing the standby workload, and instruct the standby workload to execute at least one of the binary or a different binary to replace the active workload.

In another example, a non-transitory computer-readable medium is provided that stores instructions thereon that, when executed by at least one computing device, causes the at least one computing device to perform operations for providing a standby workload to replace an active workload. The operations include initializing a container for the standby workload that includes an entry point that points to a binary to be executed by the container, modifying the entry point of the container to execute a script that monitors a communication channel for an instruction for executing the standby workload, and instructing the standby workload to execute at least one of the binary or a different binary to replace the active workload.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
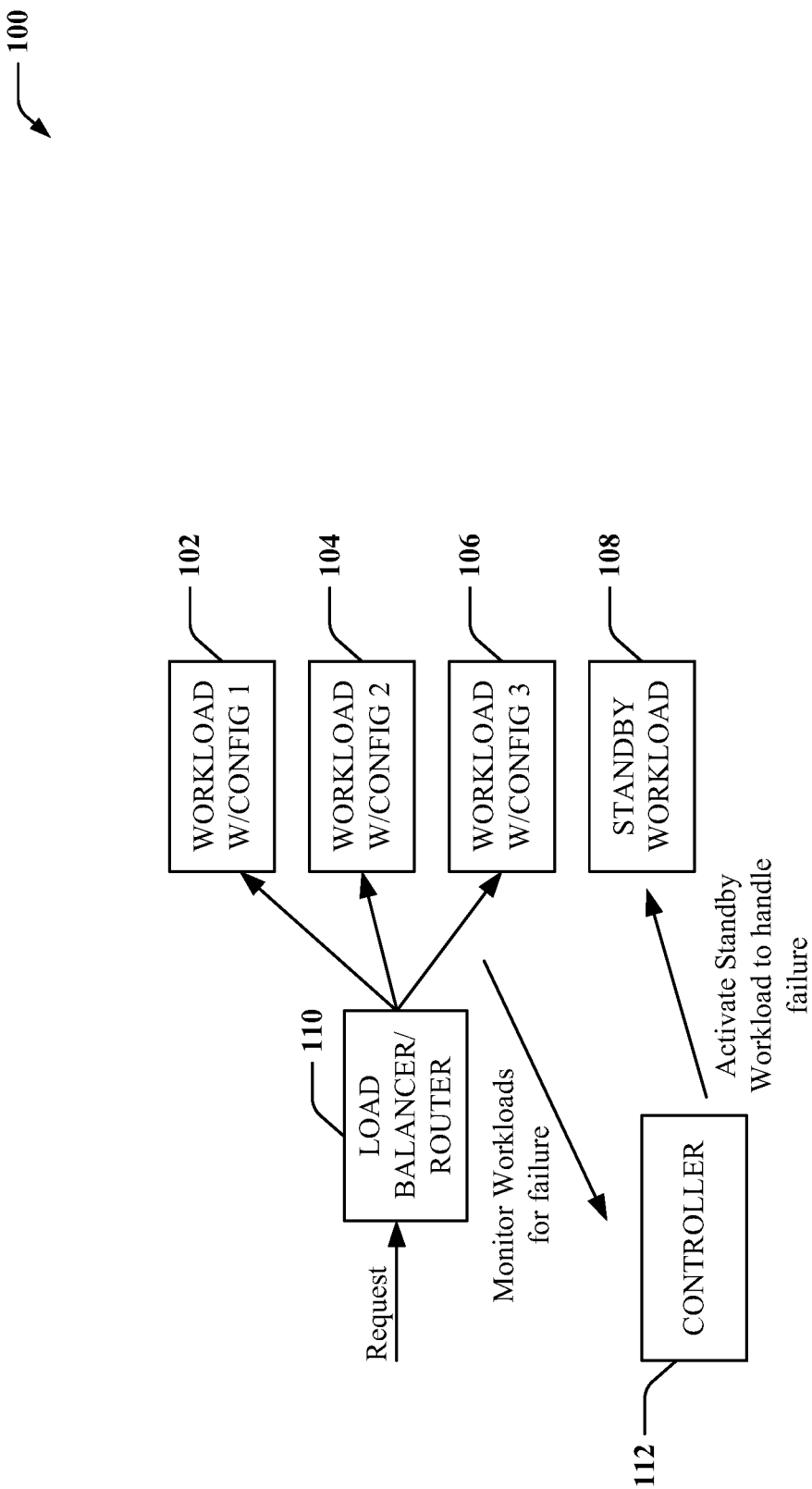
FIG. 1 is a diagram of an example of a compute cluster in a cloud-computing environment including separately configured workloads, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to deploying workloads in a cloud-computing environment. In some aspects, multiple active workloads of a process can be deployed along with one or more standby workloads that can replace one of the active workloads (e.g., if one of the active workloads fails). A node, as described herein, can include a physical machine (e.g., a physical device, such as a server or other computer), a virtual machine (e.g., where a physical machine can execute one or more virtual machines and/or where a virtual machine can execute over one or more physical machines), or any machine or location at which a workload can execute. In one aspect, the workloads may execute a same or similar process according to a different configuration. In this aspect, for example, a standby workload can be deployed as a fully functioning instance of the process that does not execute, or does not execute according to a specific configuration, until it is configured based on a specific configuration. In this aspect, when an active workload executing based on a given configuration fails, the standby workload can be configured based on the configuration, and executed to replace, or provide the function of, the previously active workload based on the associated configuration. The standby workload, however, can be initialized before failure of the active workload or other event for replacing the active workload is detected, which can save from delay associated with initializing the workload before execution. In aspects described herein, the process can be referred to as, and/or may include, an application, service, binary, codelet, etc.

In an aspect, a mutating webhook can be provided for inserting a sidecar container into each of the multiple workloads (e.g., the active workloads and the standby workload) to facilitate communicating with the main container for the given workload. In an aspect, the mutating webhook may also mount, for each workload, a common storage that stores common libraries or scripts to be executed by the workloads. In this example, the mutating webhook can modify, for each workload or at least the standby workload, the entry point for the main container to point to a script instead of the binary. The script, for example, can provide various functions including allowing the workload to be in a sleep or low power consumption state until activated by the sidecar (e.g., until the sidecar executes the binary). In an example, the script, in the sleep or low power consumption state, can monitor a communication channel for variables or commands received that can trigger activation of the standby workload. The script may also allow for modifying configuration information for the main container, such as environment variable(s), binary or binaries to execute, etc., in an example. In another example, the script may allow for dynamic loading of libraries, which may allow for calling of runtime injected code.

In addition, in an aspect, a controller can be provided for communicating with the workloads (e.g., the active workloads and the standby workload) using the sidecar container provided for each workload that can communicate with a main container for the workload. The controller can detect failure of an active workload or another event to cause replacement of the active workload with the standby workload. In this example, the controller can communicate configuration information (e.g., a value of at least one environment variable) of the active workload to the standby workload via the sidecar container of the standby workload, and/or can instruct the standby workload to execute the binary via the sidecar container. The standby workload can accordingly execute in place of the active workload being replaced. In addition, in an aspect, a new standby workload can be initialized based on the standby workload replacing the active workload.

To the extent the workloads are providing a service to other devices and/or users thereof, initializing the standby workload before failure of the active workload, or other event for replacing the active workload is detected, can improve performance for providing the service. For example, time and resources required to initialize the standby workload can be used before the standby workload is needed for replacement. Thus, the time to switch from the failed workload to the standby workload can be reduced, which can decrease the time the service is disabled, or associated performance is decreased, due to the failed workload. In other examples, the standby workload can be activated as an additional workload without necessary requiring failure of an active workload, such as where a traffic spike occurs. Thus, having the standby workload initialized before it is needed can decrease the time for providing the additional workload to handle the traffic spike. In any case, user experience in using the service can be improved in this regard.

Figure 2:
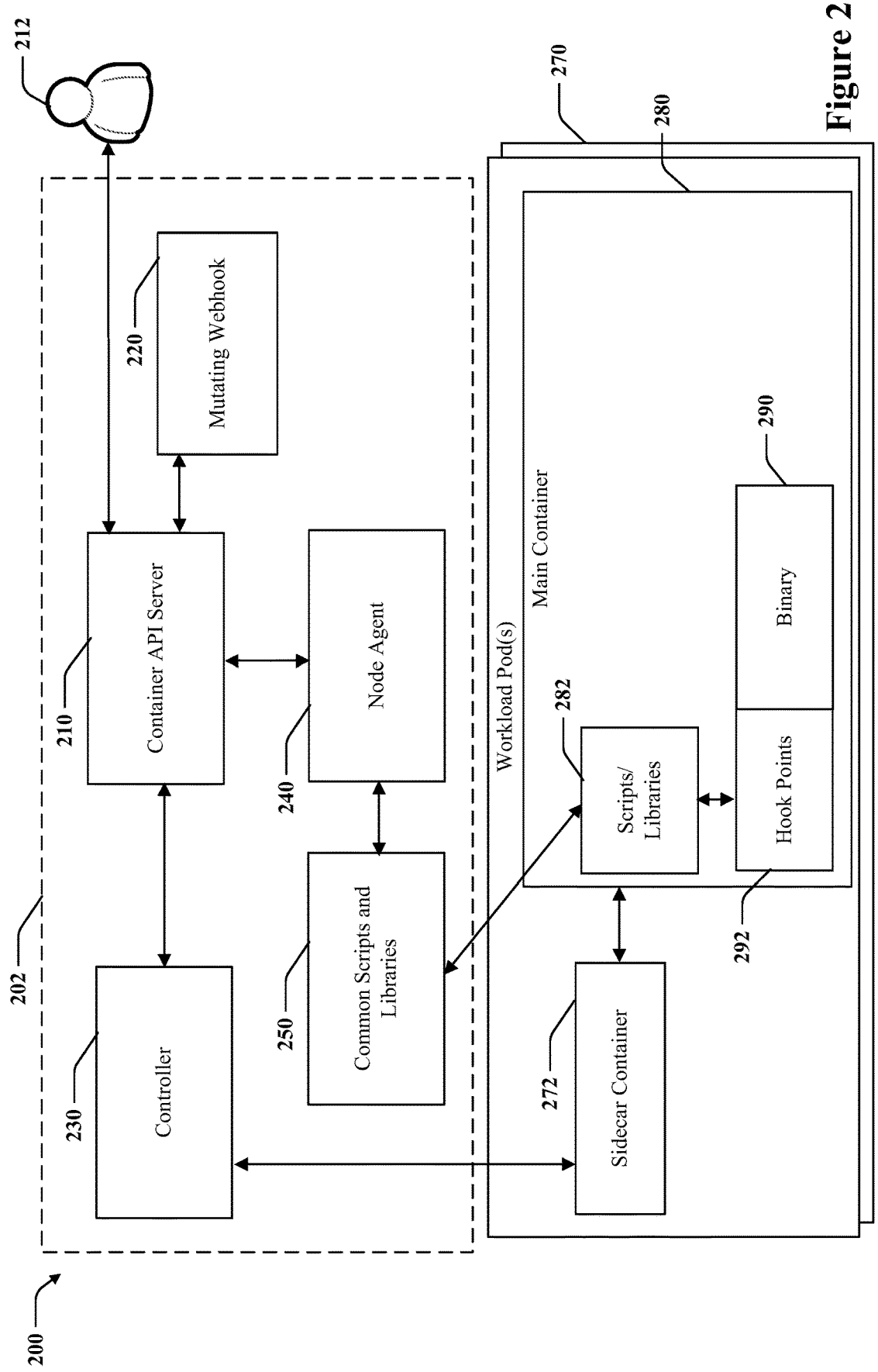
FIG. 2 is a diagram of an example architecture for deploying workloads in a container orchestration system for a cloud-computing environment, in accordance with aspects described herein.
Figure 3:
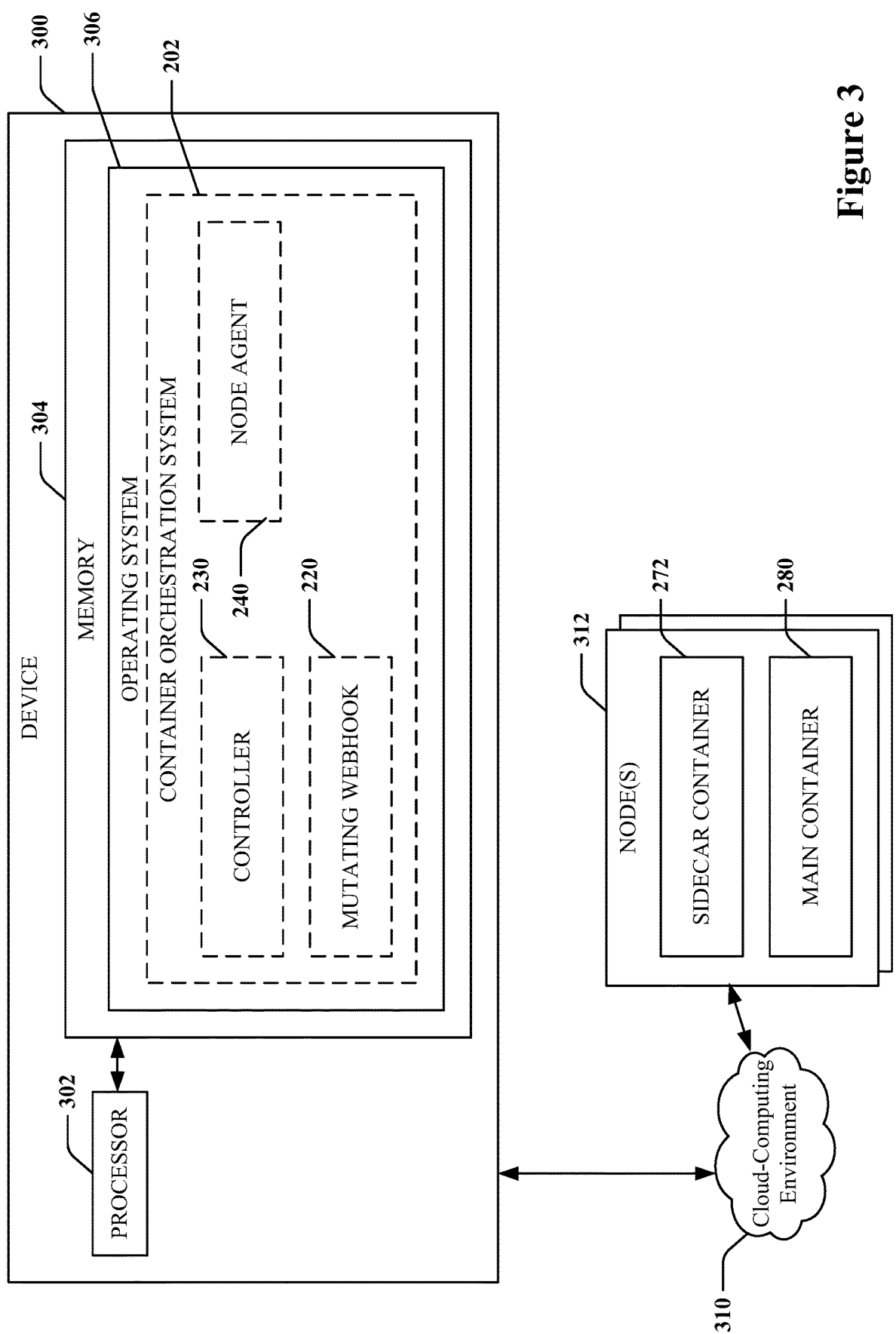
FIG. 3 is a schematic diagram of an example of a device for performing functions related to deploying or managing workloads over nodes of a cloud-computing environment, in accordance with aspects described herein.
Figure 4:
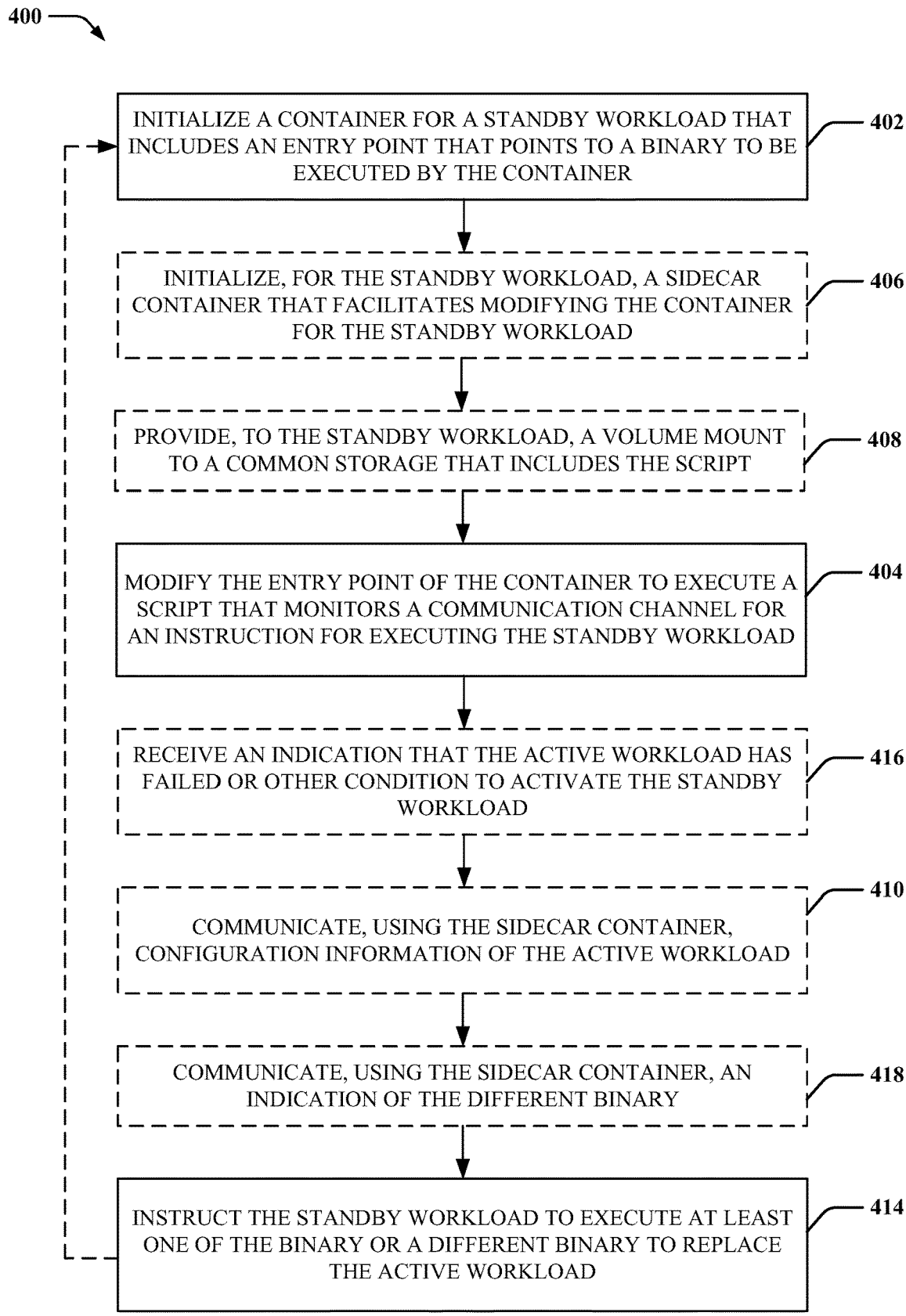
FIG. 4 is a flow diagram of an example of a method for providing a standby workload for a collection of active workloads in a cloud-computing environment, in accordance with aspects described herein.
Figure 5:
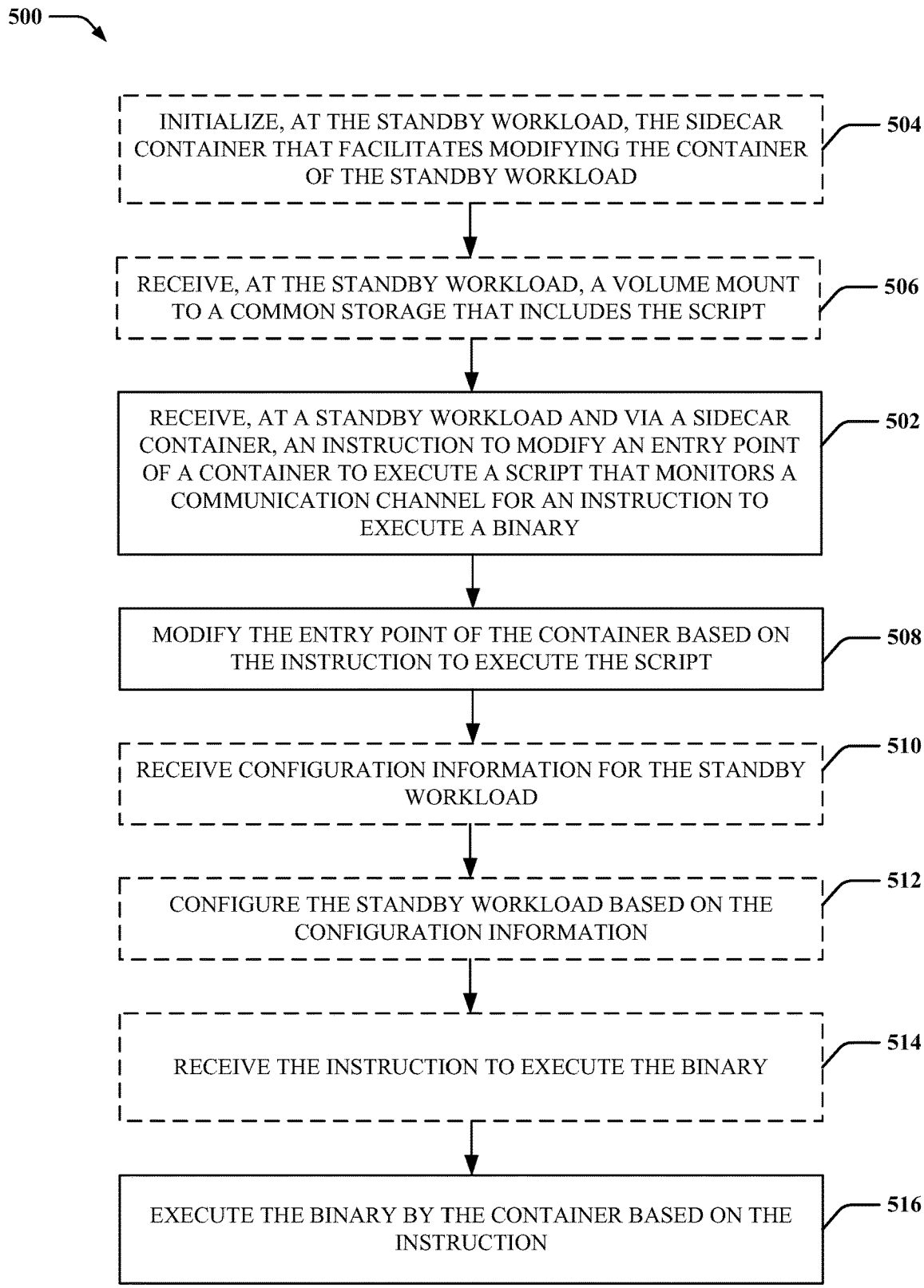
FIG. 5 is a flow diagram of an example of a method for operating a standby workload in a cloud-computing environment, in accordance with aspects described herein.

Turning now to FIGS. 1-6, examples are depicted with reference to one or more components and one or more methods that may perform the actions or operations described herein, where components and/or actions/operations in dashed line may be optional. Although the operations described below in FIGS. 4-5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example of a compute cluster 100 in a cloud-computing environment including separately configured workloads. Compute cluster 100 can include multiple workloads 102, 104, 106 that can be configured to execute at least a portion of a similar process or service (e.g., as a binary) using a different configuration. For example, workload 102 can be configured to execute the process using configuration 1, workload 104 can be configured to execute the process using configuration 2, workload 106 can be configured to execute the process using configuration 3, etc. For example, the configurations can differ by one or more parameters or corresponding values, such as an environment variable. In one specific non-limiting example, the workloads 102, 104, 106 can execute a base station process for mobile edge computing (MEC), or at least a portion of a radio access network (RAN) function of a base station process, and each workload 102, 104, 106 can be configured as a different base station (e.g., where each workload 102, 104, 106 has a different base station identifier).

Compute cluster 100 can also include a standby workload 108 that may not be configured based on a specific configuration. Standby workload 108, for example, may operate in a suspended state or be deactivated until activated to replace a failed or otherwise terminated workload. For example, a controller 112 can monitor the workloads 102, 104, 106 to detect a failure or other termination (e.g., termination of the corresponding node as a failure, a planned termination for servicing the node, etc.). In any case, based on detecting the failure or termination of the workload, controller 112 can activate standby workload 108 with the configuration of the failed workload. For example, where controller 112 detects failure of workload 106, controller 112 can activate the standby workload 108 with configuration 3 to replace workload 106. In this regard, a separate redundant workload may not be needed for each separately configured workload in order to provide redundancy for the similar (e.g., same) process being executed by the workloads 102, 104, 106. In another example, controller 112 may detect another condition for activating the standby workload 108 as a separate workload in addition to workloads 102, 104, 106, such as a traffic spike for the workloads 102, 104, 106, in which case controller 112 can activate the standby workload 108 with a separate configuration (e.g., configuration 4).

In some examples, a load balancer/router 110 can be provided to receive requests or commands for processing via the corresponding process, and can select a workload to handle the request based on the configuration of the given workload. In addition, for example, each configuration may have multiple workloads, and load balancer/router 110 can select among multiple workloads having the desired configuration based on various other considerations, as described above, such as processing load on each of the workloads or other routing considerations (e.g., distance to a location of a node on which the workload is operating, node type or hardware that may relate to the request to be fulfilled, etc.). Moreover, in an example, workloads 102, 104, 106 (and/or 108 if configured and activated) can be one stage of a multi-stage process and can pass output to another stage of the multi-stage process, which may also be specific to the corresponding configuration.

In a specific non-limiting example, the workloads 102, 104, 106 can operate a RAN function, such as in a fifth generation (5G) network, which may be part of a MEC configuration. In this example, each workload 102, 104, 106 can operate a function or node of a 5G RAN, such as a RU to provide at least PHY layer of the RAN. In an example, the workloads 102, 104, 106 can each be coupled to another workload (e.g., a MAC layer for the RU) for the specific RU or other base station or portion thereof.

In an example, the workloads 102, 104, 106, 108 can be executed on various nodes of a cloud-computing environment, as described further herein. The compute cluster 100 can be part of the cloud-computing environment and can include machines (e.g., physical or virtual) with memory, processor(s), devices, etc., and the machines can be managed by an orchestration environment. In this regard, for example, the orchestration environment can manage execution of, access to, etc. various nodes in the cloud-computing environment. In an example, the load balancer/router 110 can use abstractions of the orchestration environment to route requests to the corresponding workloads 102, 104, 106, 108. In the specific example of compute cluster 100, any workload can handle any request for the processor stage, and load balancer/router 110 can accordingly route a request to any of the corresponding workloads 102, 104, 106, 108.

FIG. 2 illustrates an example architecture 200 for deploying workloads in a container orchestration system 202 for a cloud-computing environment. For example, the container orchestration system 202 may be a Kubernetes system that executes binaries (e.g., as applications, services, codelets, etc.) within containers that are grouped into workload pods. In some specific non-limiting implementations, the applications or services may be, or may include, RAN functions. The architecture 200 includes a container application programing interface (API) server 210, a mutating webhook 220, a controller 230, a node agent 240, and one or more workload pods 270. The components of the example architecture 200, as described herein, may be provided by, or within, a cloud-computing environment (e.g., over various nodes in the cloud-computing environment).

In one example, the container API server 210 may receive and process instructions for configuring containers for execution (e.g., from a user 212 or other entity). For example, the container API server 210 may receive a configuration for a container image, which may specify various parameters for initializing and/or activating a binary, which may be part of the container image. In some implementations, the configuration may be a yet-another-markup-language (YAML) file or JavaScript Object Notation (JSON) file specifying container properties and resources. The configuration may include a header indicating dynamic loading of the binaries. The container API server 210 may control the controller 230 and node agent 240 to instantiate a main container 280 within a workload pod 270 and provide resources for the main container 280 for executing the binary.

The mutating webhook 220 may be configured (e.g., via computer-executable code or otherwise) for modifying the configuration of a container image (e.g., without user interaction). For example, the mutating webhook 220 may modify the configuration to add capabilities for the main container 280 to dynamically load the binary. For instance, the mutating webhook 220 may add a sidecar container 272 to the main container 280 for the container image, which can allow the controller 230 to communicate with the main container 280. The mutating webhook 220 may mount one or more scripts or libraries 282 into the main container 280. The scripts or libraries 282 may define functions associated with hook points 292 within the binary 290. The mutating webhook 220 may modify an entry point for the main container to run a script that loads the one or more libraries 282. For example, the scripts or libraries 282 may be defined by common scripts and libraries 250.

The controller 230 may be configured (e.g., via computer-executable code or otherwise) for controlling workload pods 270 and containers including main containers 280 and sidecar containers 272. According to specific aspects described herein, controller 230 can be similar to controller 112, and can control multiple workload pods 270, including a workload pod 270 for each of multiple active workloads and one or more standby workloads. In an example, controller 230 can detect failure or other condition associated with an active workload pod, and can replace the active workload pod with a standby workload pod. For example, controller 230 can activate multiple active workload pods 270 and can initialize a standby workload pod 270 that can serve as a backup for any one of the multiple active workload pods 270.

As described above and further herein, the mutating webhook 220 can modify the entry point of the standby workload pod 270 to point to a script 282 that can wait for communications to be received over a communication channel instructing the script 282 to execute a binary. Thus, using the script 282, the standby workload pod 270 can be initialized without executing the binary 290, and can execute the binary 290 when the script receives an instruction to do so. Accordingly, various initialization processes can be performed by (or for) the standby workload pod 270 before it is needed to replace an active workload pod 270, where the active workload pods 270 can be both initialized and also activated to execute their corresponding binaries 290. For example, as part of the initialization process, the main container 280 for the standby workload pod 270 can be setup, which may include finding a location in a compute cluster to launch the standby workload pod 270 (e.g., via a scheduler), writing a binding to the compute cluster to a store to cause a process to access the standby workload pod 270, access a container registry to check for a new image for the standby workload pod 270, download the image if available, etc. In this example, the initialization process can also include starting a container startup process for the main container 280 of the standby workload pod 270, which can include provisioning a process namespace and network namespace for isolating the main container 280, provisioning a volume mount for the main container 280, etc. without executing the binary 290. Once the standby workload pod 270 is initialized, the script 282 can be executed instead of the binary 290, and can accordingly cause the standby workload pod 270 enter a sleep or low resource consumption state. For example, the script 282 can monitor a communication channel for environment variables or other information to use in executing the binary 290, a command to execute the binary 290 or a different binary, etc.

In this regard, in an example, where the controller 230 detects failure or other condition associated with an active workload pod 270, the controller 230 can communicate environment variable values associated with the failed active workload pod to the standby workload pod 270 via the sidecar container 272 of the standby workload pod 270. The sidecar container 272 can communicate the environment variable values over a communication channel (e.g., a first-in first-out (FIFO) pipe) that is monitored by the script 282 executing on the standby workload pod 270. The script 282 can execute the binary 290 based on configuring the environment variables to replace the previously active workload. In one example, sidecar container 272 can send an instruction, over the communication channel, to execute the binary 290 (or can send another indication that the configuration is complete—e.g., that all environment variables have been sent over the communication channel). In an example, the script 282 can receive the instruction or other indication, and can accordingly execute the binary 290. In another example, controller 230 can configure a different binary for execution, sidecar container 272 can receive an indication of the different binary from the controller 230, and can indicate the different binary in the communication channel for identification and execution by the script 282.

FIG. 3 is a schematic diagram of an example of a device 300 (e.g., a computing device) for performing functions related to deploying or managing workloads over nodes of a cloud-computing environment. In an example, device 300 can include a processor 302 and/or memory 304 configured to execute or store instructions or other parameters related to providing an operating system 306, which can execute one or more applications or processes, such as, but not limited to, one or more components of a container orchestration system 202, such as, but not limited to, a controller 230 for controlling one or more workloads, a mutating webhook 220 for modifying one or more workloads, a node agent 240 for instantiating a main container of one or more workloads, etc., as described above and further herein. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component), and/or the like. Memory 304 may store instructions, parameters, data structures, etc. for use/execution by processor 302 to perform functions described herein.

In an example, container orchestration system 202 can deploy workloads over nodes of a cloud-computing environment 310 (e.g., one or more nodes 312). For example, the node(s) 312 over which a given workload is deployed can include a sidecar container 272 and/or main container 280 for the given workload. In some examples, though shown on a single device 300 for ease of explanation, container orchestration environment 202, and/or one or more components thereof, may be implemented by multiple devices distributed in a network (e.g., cloud-computing environment 310) such that different devices may provide the different functions of mutating webhook 220, controller 230, or node agent 240, as described herein, and/or a given component may be implemented over multiple devices or other resources that are coupled in the cloud-computing environment 310 (e.g., as sharing memory, processing resources, and/or the like). In a similar example, device 300 may include multiple devices, where the processor 302 and/or memory 304 can be shared or provided by pooled resources of the multiple devices.

FIG. 4 is a flowchart of an example of a method 400 for providing a standby workload for a collection of active workloads in a cloud-computing environment. For example, method 400 can be performed by a device 300 and/or one or more components thereof to facilitate workload deployment or management in a cloud-computing environment. FIG. 5 is a flowchart of an example of a method 500 for operating a standby workload in a cloud-computing environment. For example, method 500 can be performed by one or more nodes 312 and/or one or more components thereof to facilitate providing a standby workload. Methods 400 and 500 of FIGS. 4 and 5 are described in conjunction with one another below for ease of explanation, though methods 400 and 500 may not need to be performed in conjunction with one another, and indeed, different devices/nodes can independently perform method 400 or 500.

In method 400, at action 402, a container for a standby workload that includes an entry point that points to a binary to be executed by the container can be initialized. In an example, controller 230 and/or node agent 240 of a container orchestration system 202, e.g., in conjunction with processor 302, memory 304, operating system 306, etc., can initialize the container (e.g., the main container 280) for the standby workload that includes the entry point that points to the binary to be executed by the container. For example, controller 230 and/or node agent 240, and/or one or more other components of the container orchestration system 202, can initialize the container by setting up the container framework, which may include performing various initialization processes for the standby workload, as described above. The controller 230 and/or node agent 240 can setup the main container 280 for the active workloads as well and may execute the binary in the main containers 280 of the active workloads. The controller 230 and/or node agent 240 may setup the main container 280 for the standby workload as well, but without actually executing the binary, as described further herein.

For example, the controller 230 and/or node agent 240 may can setup the main container 280 for the standby workload, which may include finding a location in a compute cluster to launch the standby workload, writing a binding to the compute cluster to a store to cause a process to access the standby workload, accessing a container registry to check for a new image for the standby workload and downloading/installing the new image if available, provisioning a process namespace and network namespace for isolating the main container 280, provisioning a volume mount for the main container 280, etc. As described, for example, controller 230 and/or node agent 240 can perform the various processes to initialize the main container 280 without executing the binary to which the entry point is pointing for the standby workload. In this regard, the standby workload can be setup and ready to execute the binary (or a different binary) ahead of a time when needed to replace a failing workload or to provide additional workload resources. This can save latency otherwise associated with initializing a new workload at the time when needed.

In method 400, at action 404, the entry point of the container can be modified to execute a script that monitors a communication channel for an instruction for executing the standby workload. In an example, controller 230 of the container orchestration system 202, e.g., in conjunction with processor 302, memory 304, operating system 306, etc., can modify the entry point of the container to execute the script that monitors the communication channel for the instruction for executing the standby workload. In one example, controller 230 can modify the entry point of the main container 280 to point to the script by using the sidecar container 272 to communicate with the main container 280. For example, mutating webhook 220 can overwrite a field in the YAML or JSON that indicates the binary 290 to instead point to the script. As described above, mutating webhook 220 can also provide the volume mount to the common storage to the workload so the script is available inside the main container 280. In addition, as described further herein, the script can monitor the communication channel for communications from the sidecar container 272 that may include configuration information for the standby workload (e.g., one or more environment variables of the active workload to be replaced), the instruction to execute the binary of the standby workload (or a different binary), etc.

Thus, in an example in method 400, optionally at action 406, the sidecar container that facilitates modifying the container for the standby workload can be initialized for the standby workload. In an example, mutating webhook 220 of the container orchestration system 202, e.g., in conjunction with processor 302, memory 304, operating system 306, etc., can initialize, for the standby workload, the sidecar container (e.g., sidecar container 272) that facilitates modifying the container for the standby workload. In an example, mutating webhook 220 can initialize a sidecar container 272 for each workload (e.g., the active workloads as well) that is managed by the controller 230. Mutating webhook 220 can initialize the sidecar container 272 without user interaction, and may do so when the workload is initialized by the controller 230 and/or node agent 240 (e.g., based on a request from the controller 230 and/or node agent 240, based on receiving instructions for configuring the workload, etc.). In a specific non-limiting example, mutating webhook 220 can initialize the sidecar container 272 based on, or based on the container orchestration system 202 receiving, the YAML or JSON configuration for the workload. In any case, for example, controller 230 can use the sidecar container 272 to communicate with the main container 280 such to modify the entry point of the main container 280 to point to the script instead of the binary. For example, the sidecar container 272 can include a process that executes along with the main container 280 that can call functions of the main container 280 to communicate therewith and expose functions (e.g., via a representational state transfer (REST) API, remote procedure call (RPC), etc.) to the controller 230 to facilitate communicating with the main container 280.

In an example, the script may be specified in a store for common scripts and libraries in the container orchestration system 202 (e.g., common scripts and libraries 250). Thus, in an example in method 400, optionally at action 408, a volume mount to a common storage that includes the script can be provided to the standby workload. In an example, mutating webhook 220 of the container orchestration system 202, e.g., in conjunction with processor 302, memory 304, operating system 306, etc., can provide, to the standby workload, the volume mount to the common storage (e.g., common scripts and libraries 250) that includes the script. For example, mutating webhook 220 can mount the volume for the workload (e.g., in the main container 280 by communicating with the sidecar container 272), so that the main container 280 can access the script. In this regard, for example, mutating webhook 220 can modify the entry point of the main container 280 to point to the script as stored in the volume mount to the common storage.

With respect to the standby workload, in method 500, at action 502, an instruction can be received, at the standby workload and via a sidecar container, to modify the entry point of the container to execute a script that monitors a communication channel for an instruction to execute a binary. In an example, the standby workload can receive, via the sidecar container 272, e.g., in conjunction with a processor, memory, operating system, etc. executing on one or more nodes 312 providing the standby workload, the instruction to modify the entry point of the container to execute the script that monitors the communication channel for the instruction to execute the binary. In one example, the standby workload can receive the instruction from the sidecar container via the script, as described above. The communication channel can include substantially any mechanism that facilitates communicating between the script and sidecar container 272, such as a shared memory construct, a FIFO pipe, a network communication session using a network protocol, etc.

Thus, in an example in method 500, optionally at action 504, the sidecar container that facilitates modifying the container for the standby workload can be initialized at the standby workload. In an example, the standby workload, via the sidecar container 272, e.g., in conjunction with a processor, memory, operating system, etc. executing on one or more nodes 312 providing the standby workload, can initialize the sidecar container 272 that facilitates modifying the container (e.g., the main container 280) of the standby workload. As described above, mutating webhook 220 can cause initialization of the sidecar container 272 at the standby workload.

In an example, as script may be specified in a store for common scripts and libraries in the container orchestration system 202 (e.g., common scripts and libraries 250), in method 500, optionally at action 506, a volume mount to a common storage that includes the script can be received at the standby workload. In an example, the standby workload, via the sidecar container 272, e.g., in conjunction with a processor, memory, operating system, etc. executing on one or more nodes 312 providing the standby workload, can receive the volume mount to the common storage (e.g., common scripts and libraries 250) that includes the script. For example, mutating webhook 220 can mount the volume for the workload (e.g., in the main container 280 by communicating with the sidecar container 272), so that the main container 280 can access the script. In this regard, for example, controller 230 can modify the entry point of the main container 280 to point to the script as stored in the volume mount to the common storage, as described.

In method 500, at action 508, the entry point of the container can be modified based on the instruction to execute the script. In an example, the standby workload, via the sidecar container 272, e.g., in conjunction with a processor, memory, operating system, etc. executing on one or more nodes 312 providing the standby workload, can modify the entry point of the container based on the instruction to execute the script. For example, based on the instruction received from controller 230, the sidecar container 272 can point the entry point of the main container 280 to the script instead of the binary to cause the main container 280 to execute the script. As described above and further herein, the script can cause the main container 280 of the standby workload to monitor the communication channel for certain information, such as one or more environment variables to use when executing the binary, an indication of a different binary to execute, etc. As such, for example, the standby workload is setup and initialized, and enters a sleep or low power consumption state where the standby workload can periodically monitor the communication channel for the information without executing the binary during this time. In an example, as described above, the script may load and/or execute one or more libraries that may be in the common scripts and libraries that can be part of the volume mount mounted in action 506. For example, the common scripts and libraries can include libraries that the script can load and leverage during execution, such as libraries including functionality for monitoring the communication channel, receiving the environment variable value(s), indicating that the values are received, etc.

In method 400, optionally at action 410, configuration information of the active workload can be communicated using the sidecar container. In an example, controller 230 of the container orchestration system 202, e.g., in conjunction with processor 302, memory 304, operating system 306, etc., can communicate, using the sidecar container, the configuration information of the active workload. In one example, the active workload to which the environment variable relates can be an active workload that has failed, or can be a desired active workload for the standby workload to provide additional workload resources for the service (e.g., due to traffic spike). In an example, controller 230 can communicate the configuration information, which may include a value for the environment variable (and/or for multiple environment variables) to the sidecar container 272, and the sidecar container 272 can provide the configuration information to the script over the communication channel (e.g., in a FIFO pipe, network communication session, etc.), as described further herein. For example, the environment variable(s) can include information for setting up the standby workload to execute as a desired active workload (e.g., values of the environment variable(s) used by the active workload that has failed). In a specific non-limiting example described above, the environment variables may include a base station identifier or cell identifier.

In method 500, optionally at action 510, the configuration information for the standby workload can be received. In an example, the standby workload, via the sidecar container 272, e.g., in conjunction with a processor, memory, operating system, etc. executing on one or more nodes 312 providing the standby workload, can receive the configuration information for the standby workload. For example, the standby workload can receive the configuration information at the sidecar container 172 and from the controller 230. The configuration information can include one or more environment variables for configuring the standby workload to execute the binary 290 or another binary, a command to execute the binary 290 based on the one or more environment variables, and indication of a different binary to execute, and/or the like, as described further herein.

In method 500, optionally at action 512, the standby workload can be configured based on the configuration information. In an example, the standby workload, via the sidecar container 272 or script, e.g., in conjunction with a processor, memory, operating system, etc. executing on one or more nodes 312 providing the standby workload, can be configured based on the configuration information. For example, sidecar container 272 can provide the configuration information (e.g., one or more environment variables) to the script via the communication channel. For example, as described, the script can monitor the communication channel between the script and the sidecar container 272 and can detect one or more environment variables in the communication channel (e.g., in the FIFO pipe). The script can accordingly configure the standby workload based on the received configuration information, which can include setting the one or more environment variables in the main container 280 for executing the binary (or a different binary).

In method 400, at action 414, the standby workload can be instructed to execute at least one of the binary or a different binary to replace the active workload. In an example, controller 230 of the container orchestration system 202, e.g., in conjunction with processor 302, memory 304, operating system 306, etc., can instruct the standby workload to execute at least one of the binary or the different binary to replace the active workload. For example, controller 230 can communicate with the sidecar container 272 of the standby workload to cause execution of the binary or the different binary. In an example, controller 230 may call a function of the sidecar container 272 for executing a binary, where the function may indicate to the script to call the original entry point binary of the main container 280 for execution in the main container 280, or may call a binary specified by the controller 230 for execute in the main container 280, etc. In an example, controller 230 can instruct the standby workload to execute the binary or the different binary along with communicating configuration information at action 410.

In method 500, optionally at action 514, the instruction to execute the binary can be received. In an example, the standby workload, via the sidecar container 272, e.g., in conjunction with a processor, memory, operating system, etc. executing on one or more nodes 312 providing the standby workload, can receive the instruction to execute the binary. In one example, sidecar container 272 can receive the instruction from the controller 230. In an example, sidecar container 272 can receive the instruction along with configuration information received at action 510, where the instruction can indicate to execute the binary once configuration is complete.

In method 500, at action 516, the binary can be executed based on the instruction. In an example, the standby workload, via the sidecar container 272, e.g., in conjunction with a processor, memory, operating system, etc. executing on one or more nodes 312 providing the standby workload, can execute the binary based on the instruction (e.g., as received at action 514). As described, for example, controller 230 can call a function of the sidecar container 272 to execute the binary, and the sidecar container 272 of the standby workload can provide the instruction to the script via the communication channel. For example, the instruction can include or be represented by a notification that the configuration information is complete. In an example, the instruction can include an identifier associated with the specific environment variable, a special symbol or signal sent by the sidecar container 272 over the communication channel to indicate, to the script, that configuration is complete (e.g., that all environment variables for the binary have been sent by the sidecar container 272, and thus the binary can be executed), and/or the like.

In any case, for example, the sidecar container 272 can provide the instruction over the communication channel, which the script can detect and can accordingly execute the binary (e.g., binary 290) based on the instruction. The script can accordingly cause the main container 280 to execute the binary, whether the binary that was pointed to by the original entry point or a different binary indicated in configuration information from the controller 230 (e.g., via the sidecar container 272), as described further herein. With the binary executing based on the environment variable(s) of an actual workload, the standby workload can replace or become an active workload.

In method 400, optionally at action 416, an indication that the active workload has failed, or other condition to activate the standby workload, can be received. In an example, controller 230 of the container orchestration system 202, e.g., in conjunction with processor 302, memory 304, operating system 306, etc., can receive an indication that the active workload has failed or other condition to activate the standby workload. For example, controller 230 can monitor the various workloads of the service that are managed in the container orchestration system 202, and can determine when an active workload has failed or is failing. In an example, controller 230 can detect that the workload or node executing the workload is offline, decrease in throughput or resource availability at the workload or node executing the workload, etc. In an example, controller 230 can accordingly obtain values for one or more environment variables used by the active workload that is failing, and can communicate the values for the environment variables using the communication channel (e.g., at action 410) to cause the standby workload to load the values for the one or more environment variables and execute the binary to replace the failing (or failed) active workload.

In another example, controller 230 can receive the other indication to activate the standby workload, such as an indication of a traffic spike over the workloads, such that activating the standby workload as an additional workload may help to offload traffic from the other active workloads. In this example, controller 230 can obtain or specify value for one or more environment variables that allow the standby workload to activate and handle traffic along with the active workloads. In the specific MEC example described above, controller 230 can assign a new base station identifier to the standby workload.

In another example, the standby workload can be configured to execute a different binary, such that the controller 230 may indicate the binary to be executed at some time after the main container 280 for the standby workload is setup. For example, in method 400, optionally at action 418, an indication of the different binary can be communicated to the sidecar container. In an example, controller 230 of the container orchestration system 202, e.g., in conjunction with processor 302, memory 304, operating system 306, etc., can communicate, to the sidecar container, the indication of the different binary. For example, controller 230 can determine the different binary for the standby workload to execute based on one or more parameters, and can provide the indication, or a pointer to a location of, the different binary to the standby workload via the sidecar container 272. In an example, controller 230 can indicate the different binary along with communicating configuration information at action 410. In any case, in method 500 at action 510, the configuration information received can include an indication of the different binary, and action 516 can accordingly include executing the different binary.

In addition, for example, as the standby workload is activated as an active workload, another standby workload can be initialized in its place. In an example, based on activating the standby workload by instructing the standby workload to execute the binary or the different binary, method 400 can proceed to action 402 to initialize a container for a second standby workload that includes an entry point that points to the binary to be executed by the container. In this regard, for example, method 400 can be performed for the second standby workload to execute the script, etc., so the second standby workload can be setup and can be in the low power consumption state operated by the script to monitor the communication channel for environment variable value(s) that may cause the standby workload to replace an active workload.

Figure 6:
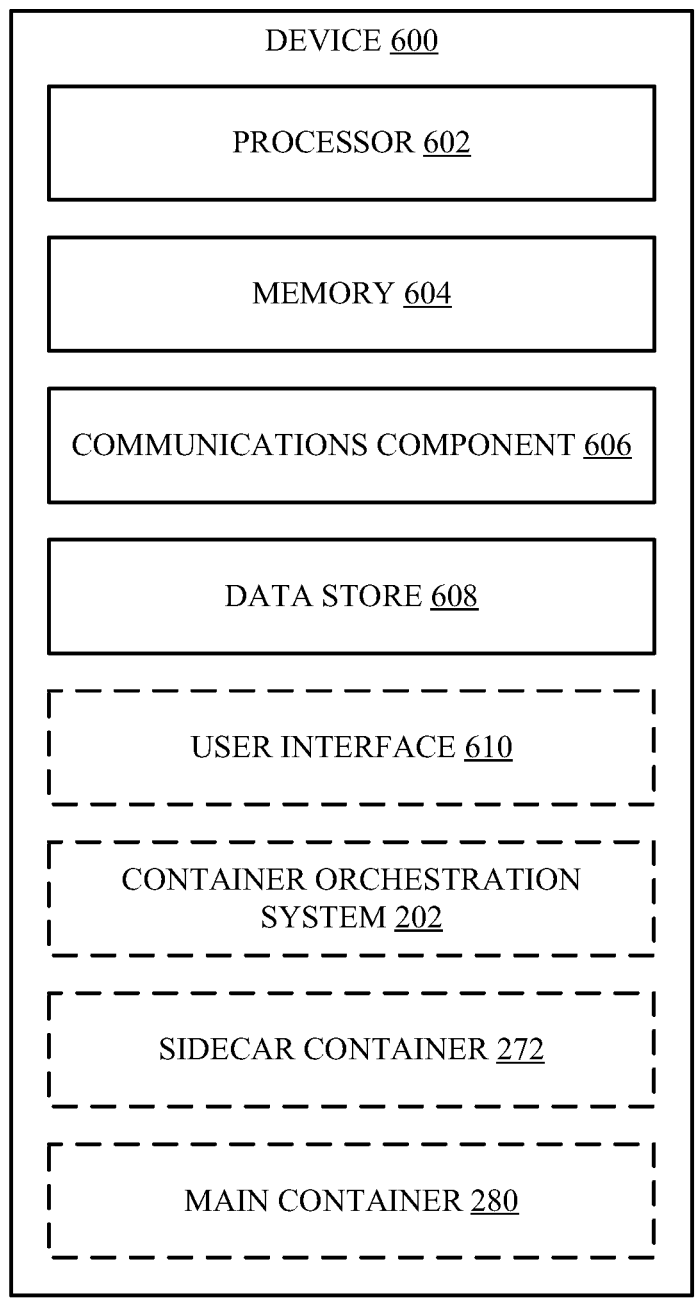
FIG. 6 is a schematic diagram of an example of a device for performing functions described herein, in accordance with aspects described herein.

FIG. 6 illustrates an example of device 600 including additional optional component details as those shown in FIG. 3. In one aspect, device 600 may include processor 602, which may be similar to processor 302 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 304 such as for storing local versions of operating systems (or components thereof) and/or applications being executed by processor 602, such as a container orchestration system 202, sidecar container 272, main container 280, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc.) not currently being executed by processor 602. In addition, data store 608 may be a data repository for container orchestration system 202, sidecar container 272, main container 280, and/or one or more other components of the device 600.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for providing a standby workload to replace an active workload, comprising:
   initializing a container for the standby workload that includes an entry point that points to a binary to be executed by the container;
   modifying the entry point of the container to execute a script that monitors a communication channel for an instruction for executing the standby workload; and
   instructing the standby workload to execute at least one of the binary or a different binary to replace the active workload.

2. The computer-implemented method of claim 1, further comprising initializing, for the standby workload, a sidecar container that facilitates modifying the container for the standby workload, wherein instructing the standby workload to execute at least one of the binary or the different binary includes communicating the instruction using the sidecar container.

3. The computer-implemented method of claim 2, further comprising indicating, to the sidecar container, configuration information for configuring the standby workload, wherein the sidecar container provides the configuration information to the script over the communication channel.

4. The computer-implemented method of claim 3, further comprising receiving an indication that the active workload has failed, wherein indicating the configuration information to the sidecar container and instructing the standby workload to execute at least one of the binary or the different binary are based on the indication.

5. The computer-implemented method of claim 3, wherein the configuration information includes an indication of the different binary.

6. The computer-implemented method of claim 1, further comprising providing, to the standby workload, a volume mount to a common storage that includes the script, wherein modifying the entry point of the container includes modifying the entry point to point to the script in the common storage.

7. The computer-implemented method of claim 6, wherein the script loads, in the standby workload, one or more libraries from the common storage.

8. The computer-implemented method of claim 1, wherein the active workload is one of multiple active workloads in a cluster, wherein each of the multiple active workloads executes the binary based on a different value for one or more environment variables.

9. The computer-implemented method of claim 1, further comprising:
   initializing, based on instructing the standby workload to execute at least one of the binary or the different binary, a second container for a second standby workload that includes a second entry point that points to the binary to be executed by the second container; and
   modifying the second entry point of the second container to execute the script that monitors the communication channel for the instruction for executing the second standby workload to replace a different active workload.

10. A device for providing a standby workload to replace an active workload, comprising:
  a memory storing one or more parameters or instructions for deploying workloads in a cloud-computing environment; and
  at least one processor coupled to the memory, wherein the at least one processor is configured to:
    initialize a container for the standby workload that includes an entry point that points to a binary to be executed by the container;
    modify the entry point of the container to execute a script that monitors a communication channel for an instruction for executing the standby workload; and
    instruct the standby workload to execute at least one of the binary or a different binary to replace the active workload.

11. The device of claim 10, wherein the at least one processor is configured to initialize, for the standby workload, a sidecar container that facilitates modifying the container for the standby workload, wherein the at least one processor is configured to instruct the standby workload to execute at least one of the binary or the different binary at least in part by communicating the instruction using the sidecar container.

12. The device of claim 11, wherein the at least one processor is configured to indicate, to the sidecar container, configuration information for configuring the standby workload, wherein the sidecar container provides the configuration information to the script over the communication channel.

13. The device of claim 12, wherein the at least one processor is configured to receive an indication that the active workload has failed, wherein the at least one processor is configured to indicate the configuration information to the sidecar container, and instruct the standby workload to execute at least one of the binary or the different binary based on the indication.

14. The device of claim 12, wherein the configuration information includes an indication of the different binary.

15. The device of claim 10, wherein the at least one processor is configured to provide, to the standby workload, a volume mount to a common storage that includes the script, wherein the at least one processor is configured to modify the entry point of the container at least in part by modifying the entry point to point to the script in the common storage.

16. The device of claim 15, wherein the script loads, in the standby workload, one or more libraries from the common storage.

17. The device of claim 10, wherein the active workload is one of multiple active workloads in a cluster, wherein each of the multiple active workloads executes the binary based on a different value for one or more environment variables.

18. The device of claim 10, wherein the at least one processor is configured to:
  initialize, based on instructing the standby workload to execute at least one of the binary or the different binary, a second container for a second standby workload that includes a second entry point that points to the binary to be executed by the second container; and
  modify the second entry point of the second container to execute the script that monitors the communication channel for the instruction for executing the second standby workload to replace a different active workload.

19. A non-transitory computer-readable medium storing instructions thereon that, when executed by at least one computing device, causes the at least one computing device to perform operations for providing a standby workload to replace an active workload, comprising:
  initializing a container for the standby workload that includes an entry point that points to a binary to be executed by the container;
  modifying the entry point of the container to execute a script that monitors a communication channel for an instruction for executing the standby workload; and
  instructing the standby workload to execute at least one of the binary or a different binary to replace the active workload.

20. The non-transitory computer-readable medium of claim 19, the operations further comprising initializing, for the standby workload, a sidecar container that facilitates modifying the container for the standby workload, wherein instructing the standby workload to execute at least one of the binary or the different binary includes communicating the instruction using the sidecar container.

* * * * *